No. 849,065. PATENTED APR. 2, 1907.
C. W. GUTTZEIT.
ROPE CLAMP.
APPLICATION FILED MAR. 20, 1906.
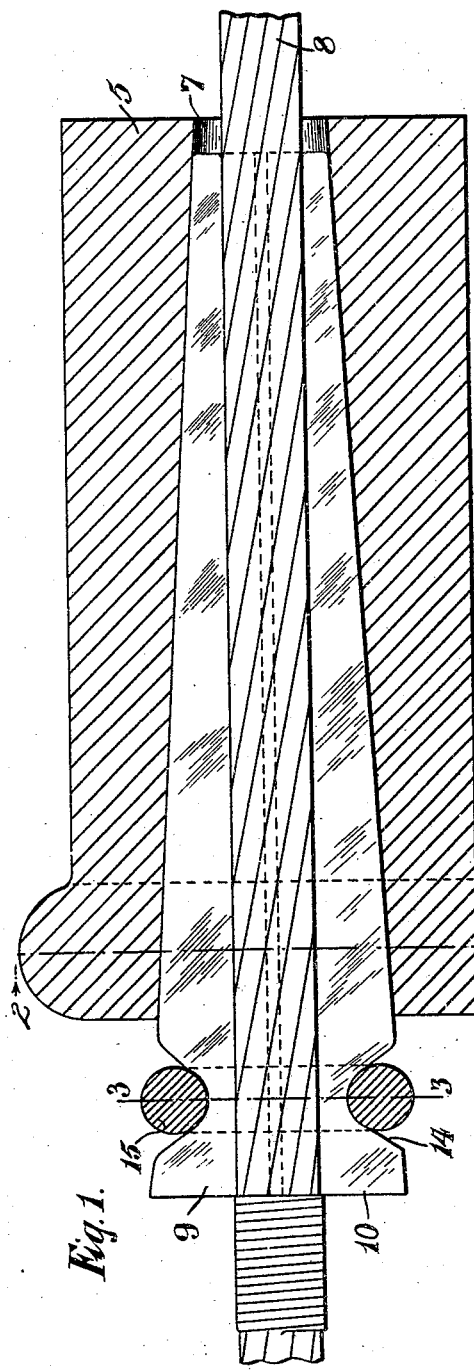
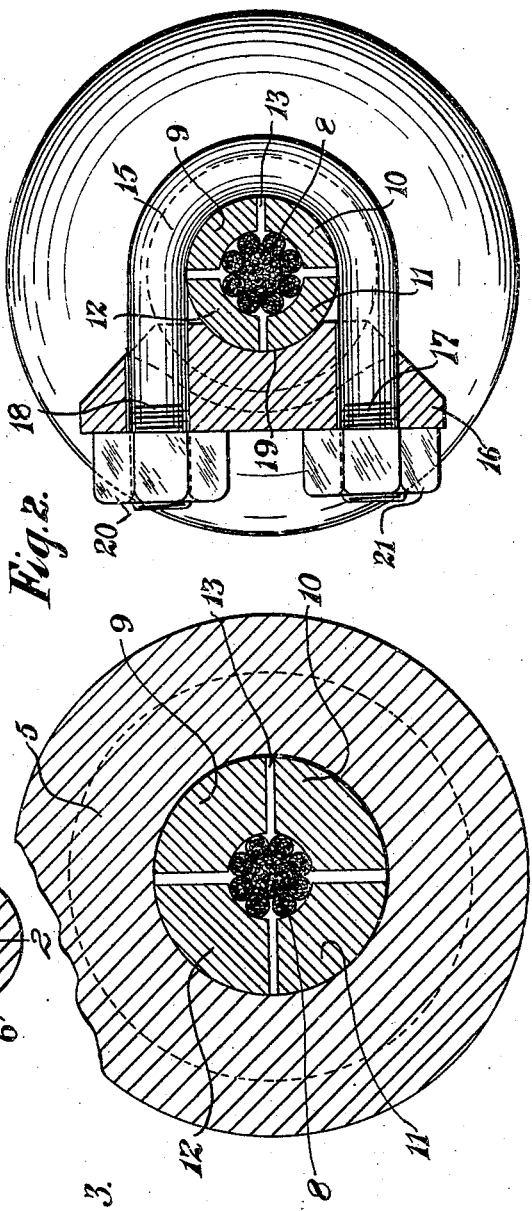
Witnesses:
Harry Fleischer,
Robert Adt.
Inventor:
Charles W. Guttzeit,
By his Attorney, F. H. Richards.
THE NORRIS PETERS CO., WASHINGTON, D. C.

UNITED STATES PATENT OFFICE.

CHARLES W. GUTTZEIT, OF HIGH BRIDGE, NEW JERSEY.

ROPE-CLAMP.

No. 849,065.  Specification of Letters Patent.  Patented April 2, 1907.

Application filed March 20, 1906. Serial No. 306,971.

*To all whom it may concern:*

Be it known that I, CHARLES W. GUTTZEIT, a citizen of the United States, residing in High Bridge, in the county of Hunterdon and State of New Jersey, have invented certain new and useful Improvements in Rope-Clamps, of which the following is a specification.

This invention relates to clamping devices, and is particularly designed for use in clamping a sleeve or the like member upon a cylindrical body, such as metallic rope or cable.

The objects of the invention are to provide an improved form of clamping device in which the longitudinal movement of one member upon other members will serve to clamp the device upon the rope or cable and also to provide an additional clamping means that is readily adjustable to accommodate various diameters of cable and which device is very simple in construction and operation, so that the clamp can be very quickly attached and detached, and which will not tend to cut or kink the strands of the cable, but provide uniform pressure throughout the length of the clamp.

In the accompanying drawings, representing one embodiment of my invention, Figure 1 is a section taken through the axis of the device, showing the clamp locked on a cable. Fig. 2 is a section on the line 3 3 of Fig. 1, and Fig. 3 is a section on the line 2 2 of Fig. 1.

The device as illustrated comprises an outer tubular member or sleeve 5, whose exterior may be of any desired form, being shown as cylindrical, but provided at one end with an enlargement or bead 6. The bore 7 of the sleeve 5 is made tapering and is shown as converging from the bead end to the other end. Between the wall of the bore 7 and a cable 8 are arranged a plurality or series of wedge members. These members are tapered in the opposite direction—that is, the smaller end is located at the end of the sleeve opposite the beaded end. By forcing these wedge members in the sleeve they will tightly clamp the cable 8 on account of their wedge or tapering shape and the inclined bore of the sleeve. In the form shown there are four wedge members 9, 10, 11, and 12, that are arranged in a series. These four members inclose a substantially cylindrical space, and therefore tightly grip the cable, as shown in Figs. 2 and 3. The outer faces of the wedge members together form a cone-frustum, and the bore of the sleeve 5 is provided with a similar conical form. By this means when the wedge members are simultaneously moved longitudinally in the sleeve in one direction they will move radially inward and tightly grip the cable 8. Sufficient space 13 is provided between the adjacent edges of the wedge members, so that when the wedge members are drawn together by the sleeve and clamping means and engage the cable or other member in their interior their adjacent edges will not be brought into engagement.

In order to lock the four wedge members together and cause their simultaneous movement relative to the outer sleeve, suitable locking means is provided at one end of the segmentary wedge member. The larger end of the wedge member is arranged to project beyond the entering end of the sleeve and is there provided with an annular or peripheral groove 14. A U-shaped clamp and bolt 15 is provided to press one-half of this groove, as shown in Fig. 3. A clamping-block 16, having apertures 17 and 18, is inserted on the ends of the bolt, as shown, and has a curved portion 19, arranged to engage the side of the groove opposite that engaged by the bolt. Nuts 20 and 21 screw on the ends of the bolt against the block 17 and serve to tightly clamp the members of the segmentary wedge in position and against relative longitudinal movement.

When it is desired to attach the clamping device, the wedge members are placed around the cable and the clamping bolt and block placed in position and secured by the two nuts. Thereupon the sleeve is slid on the cable from one end and the smaller end of the wedge member is inserted in the larger end of the sleeve-bore and then the wedge is driven home in the sleeve. It will be observed that the wedge members can be attached at any part of the rope and do not require to be inserted on one end of the rope.

Having thus described my invention, I claim—

A rope-clamp comprising a sleeve, a series of wedge members in the sleeve coöperating with the bore thereof to clamp the rope against longitudinal movement, the wedge members projecting beyond the sleeve at their larger ends and provided with a peripheral groove, a U-shaped bolt in the groove of the wedge members and engaging a plurality of such members, an apertured block fitted on the bolt and extending into the grooved portions of the other wedge members, and nuts on the bolt ends engaging the block and securely clamping the wedge members.

CHARLES W. GUTTZEIT.

Witnesses:
WILLIAM H. REID,
F. E. BOYCE.